(12) United States Patent
Honda

(10) Patent No.: US 8,958,148 B2
(45) Date of Patent: Feb. 17, 2015

(54) MICROSCOPE

(75) Inventor: Susumu Honda, Tokyo (JP)

(73) Assignee: Olympus Corporation, Tokyo (JP)

( * ) Notice: Subject to any disclaimer, the term of this patent is extended or adjusted under 35 U.S.C. 154(b) by 376 days.

(21) Appl. No.: 13/423,634

(22) Filed: Mar. 19, 2012

(65) Prior Publication Data

US 2012/0243081 A1   Sep. 27, 2012

(30) Foreign Application Priority Data

Mar. 23, 2011   (JP) ................. 2011-064994

(51) Int. Cl.
| | | |
|---|---|---|
| G02B 21/06 | (2006.01) | |
| G02B 21/00 | (2006.01) | |
| G02B 7/00 | (2006.01) | |
| G02B 21/16 | (2006.01) | |
| G02B 26/10 | (2006.01) | |

(52) U.S. Cl.
CPC ............. G02B 21/002 (2013.01); G02B 7/005 (2013.01); G02B 7/006 (2013.01); G02B 21/16 (2013.01); G02B 26/101 (2013.01)
USPC ......................................... 359/388; 250/234

(58) Field of Classification Search
CPC ............. G02B 21/002; G02B 26/101; G02B 21/0016; G02B 21/16; G02B 7/005
USPC .................... 359/368, 388; 250/234
See application file for complete search history.

(56) References Cited

U.S. PATENT DOCUMENTS

| | | | |
|---|---|---|---|
| 5,777,783 A * | 7/1998 | Endou et al. ................... | 359/385 |
| 6,035,281 A | 3/2000 | Crosskey et al. | |
| 6,166,385 A | 12/2000 | Webb et al. | |
| 6,344,653 B1 | 2/2002 | Webb et al. | |

(Continued)

FOREIGN PATENT DOCUMENTS

| | | |
|---|---|---|
| EP | 1 959 290 A1 | 8/2008 |
| JP | 8-271792 A | 10/1996 |

(Continued)

OTHER PUBLICATIONS

Extended European Search Report (EESR) dated Nov. 30, 2012 (in English) issued in counterpart European Application No. 12001935.1.

(Continued)

*Primary Examiner* — Frank Font
(74) *Attorney, Agent, or Firm* — Holtz, Holtz, Goodman & Chick PC

(57) ABSTRACT

A microscope includes: an objective lens radiating laser light and illumination light onto a specimen; a first detection optical system detecting first observation light produced from the specimen when the laser light is radiated; a second detection optical system detecting second observation light produced from the specimen when the illumination light is radiated; optical elements placed so as to be capable of being inserted into or removed from a light path of the first detection optical system or the second detection optical system; a rotating turret selectively switching the optical elements to be inserted into the light path; a storage section storing correction information about a relative misalignment between the first observation light and the second observation light caused when the optical elements are switched; and a control section correcting the relative misalignment between the first observation light and the second observation light based on the correction information.

17 Claims, 15 Drawing Sheets

(56) References Cited

U.S. PATENT DOCUMENTS

| | | |
|---|---|---|
| 7,002,717 B1 | 2/2006 | Storz et al. |
| 7,342,219 B2 * | 3/2008 | Araya et al. .................. 250/234 |
| 2002/0181096 A1 * | 12/2002 | Sasaki ........................... 359/389 |
| 2004/0195497 A1 | 10/2004 | Sasaki |
| 2005/0263690 A1 | 12/2005 | Araya et al. |
| 2006/0012892 A1 | 1/2006 | Steinert et al. |
| 2007/0253044 A1 | 11/2007 | Steinert et al. |
| 2007/0253046 A1 | 11/2007 | Steinert et al. |
| 2008/0198449 A1 | 8/2008 | Hattori et al. |

FOREIGN PATENT DOCUMENTS

| | | |
|---|---|---|
| JP | 11055252 A | 2/1999 |
| JP | 11-231223 A | 8/1999 |
| JP | 2001166245 A | 6/2001 |
| JP | 2007047465 A | 2/2007 |
| JP | 2008-203416 A | 9/2008 |
| JP | 2009145567 A | 7/2009 |
| JP | 2010286566 A | 12/2010 |
| WO | WO 97/11355 A1 | 3/1997 |

OTHER PUBLICATIONS

Partial European Search Report (PESR) dated Jun. 27, 2012 (in English) in counterpart European Application No. 12001935.1.
Japanese Office Action dated Jun. 24, 2014 issued in counterpart Japanese Application No. 2011-064994.
European Office Action dated Sep. 25, 2014, issued in counterpart European Application No. 12001935.1.

* cited by examiner

FIG. 15A

| GALVANOMETER CONTROL SECTION | | ExDM TURRET | | | |
|---|---|---|---|---|---|
| | | DM1 | DM2 | DM3 | ... |
| CUBE TURRET | DM1 | A1 | B1 | C1 | ... |
| | DM2 | A2 | B2 | C2 | ... |
| | DM3 | A3 | B3 | C3 | ... |
| | ... | ... | ... | ... | ... |

FIG. 15B

| OPTICAL-AXIS SHIFT CONTROL SECTION | | ExDM TURRET | | | |
|---|---|---|---|---|---|
| | | DM1 | DM2 | DM3 | ... |
| CUBE TURRET | DM1 | A1' | B1' | C1' | ... |
| | DM2 | A2' | B2' | C2' | ... |
| | DM3 | A3' | B3' | C3' | ... |
| | ... | ... | ... | ... | ... |

MICROSCOPE

CROSS-REFERENCE TO RELATED APPLICATIONS

This application is based on Japanese Patent Application No. 2011-064994, the contents of which are incorporated herein by reference.

BACKGROUND OF THE INVENTION

1. Field of the Invention

The present invention relates to a microscope.

2. Description of Related Art

A microscope that includes a light scanning section and an image acquisition section (CCD) and that acquires a composite image by superimposing an image acquired by performing 2D scanning of laser light on a specimen with the light scanning section and an image acquired by imaging return light from the specimen with the image acquisition section has been known in the related art (for example, see Japanese Unexamined Patent Application, Publication No. Hei 11-231223).

In the microscope disclosed in Japanese Unexamined Patent Application, Publication No. Hei 11-231223, an optical element (for example, a dichroic beam splitter that separates an observation optical system used for laser scanning and an observation optical system used by the image acquisition section) placed in the light path needs to be switched to or replaced with an appropriate optical element, according to the wavelength of laser light used by the light scanning section and that of illumination light used by the image acquisition section.

However, because such optical elements have individual differences in the reflection angle and the seating position, the optical axes of the laser light and the illumination light are shifted when the optical elements are switched or replaced. As a result, there is a disadvantage in that a displacement is caused between an image acquired by performing 2D scanning of the laser light on the specimen with the light scanning section and an image acquired from return light coming from the specimen with the image acquisition section.

BRIEF SUMMARY OF THE INVENTION

The present invention provides a microscope capable of preventing displacement between a plurality of images acquired by radiating light having different wavelengths onto a specimen.

One aspect according to the present invention is a microscope including: a radiation optical system that radiates first illumination light and second illumination light onto a specimen; a first detection optical system that detects first observation light produced from the specimen when the first illumination light is radiated by the radiation optical system; a second detection optical system that detects second observation light produced from the specimen when the second illumination light is radiated by the radiation optical system; a plurality of optical elements that are placed so as to be capable of being inserted into or removed from a light path of at least one of the first detection optical system and the second detection optical system; a switching section that selectively switches the optical elements to be inserted into the light path; a storage section that stores correction information about a relative misalignment between the first observation light and the second observation light, caused when the optical elements are switched by the switching section; and a correction section that corrects the relative misalignment between the first observation light and the second observation light based on the correction information stored in the storage section.

According to the above-described aspect, when the radiation optical system radiates the first illumination light, the first observation light is produced from the specimen. On the other hand, when the radiation optical system radiates the second illumination light, the second observation light is produced from the specimen. At this time, the plurality of optical elements are selectively switched by the switching section, and the optical elements corresponding to the respective wavelengths of the first observation light and the second observation light are placed in the light paths.

In this case, the optical axes of the first observation light and the second observation light are shifted due to the individual differences in the reflection angle and the seating position of the optical elements, thus causing a displacement between an image of the first observation light and an image of the second observation light. Therefore, the correction information about the relative misalignment between the first observation light and the second observation light caused when the switching section switches the optical elements is stored in advance in the storage section, and the correction section corrects the relative misalignment between the first observation light and the second observation light by using the correction information. Thus, it is possible to acquire a plurality of images (an image of the first observation light and an image of the second observation light) without any displacement. Therefore, for example, two fluorescence images (an image of the first observation light and an image of the second observation light) can be displayed with the corresponding positions on the specimen being matched.

In the above-described aspect, a scanning section that performs 2D scanning of the first illumination light on the specimen may be further included, and the correction section may operate the scanning section based on the correction information stored in the storage section.

By operating the scanning section based on the correction information stored in the storage section, it is possible to correct the relative displacement between a 2D-scanning image of the first observation light and an image of the second observation light.

In the above-described aspect, a scanning section that performs 2D scanning of the first illumination light on the specimen may be further included, the scanning section may have a resonant galvanometer mirror; and the correction section may rotate the resonant galvanometer mirror.

By using the resonant galvanometer mirror in the scanning section, a 2D-scanning image of the specimen can be acquired at high speed. However, fine-tuning of the optical axis of the first observation light cannot be performed with the resonant galvanometer mirror. Therefore, by rotating the resonant galvanometer mirror, it is possible to perform fine-tuning of the optical axis of the first observation light and to correct the relative displacement between the 2D-scanning image of the first observation light and the image of the second observation light.

In the above-described aspect, a scanning section that performs 2D scanning of the first illumination light on the specimen may be further included, the scanning section may have a resonant galvanometer mirror; and the correction section may operate a mirror whose angle can be changed in the same direction as a scanning direction of the resonant galvanometer mirror.

By changing the angle of the mirror in the same direction as the scanning direction of the resonant galvanometer mirror, it is possible to perform fine-tuning of the optical axis of the first observation light and to correct the relative displacement between the 2D-scanning image of the first observation light and the image of the second observation light. Furthermore, by using the resonant galvanometer mirror in the scanning section, a 2D-scanning image of the specimen can be acquired at high speed.

In the above-described aspect, a detection section of the second detection optical system may be a CCD; and the correction section may adjust a viewing-field center position of an image acquired by the CCD, based on the correction information stored in the storage section.

By adjusting the viewing-field center position of an image acquired by the CCD based on the correction information stored in the storage section, the relative displacement between the image of the first observation light and the image of the second observation light can be corrected. Furthermore, when the CCD is used as the detection section of the second detection optical system, a 2D image of the specimen can be acquired at high speed.

In the above-described aspect, an objective lens that radiates the first illumination light and the second illumination light onto the specimen and collects the first observation light and the second observation light; an optical-axis shifting section that shifts the first illumination light in a pupil of the objective lens in a direction intersecting an optical axis; and an optical-axis correcting section that operates the optical-axis shifting section based on the correction information stored in the storage section may be further included.

Furthermore, the optical-axis shifting section may include: a flat parallel plate that is disposed on an optical axis of the first illumination light; and actuators that rotate the flat parallel plate about mutually orthogonal axes extending in two directions orthogonal to the optical axis of the first illumination light.

According to the present invention, an advantage is afforded in that it is possible to prevent the displacement between a plurality of images acquired by radiating light having different wavelengths onto the specimen.

BRIEF DESCRIPTION OF THE SEVERAL VIEWS OF THE DRAWINGS

FIG. 15A is a diagram showing a table used for correcting the galvanometer scanner, stored in a storage section provided in the microscope shown in FIG. 13.

FIG. 15B is a diagram showing a table used for optical-axis shift correction, stored in the storage section provided in the microscope shown in FIG. 13.

DETAILED DESCRIPTION OF THE INVENTION

First Embodiment

A microscope 1 according to a first embodiment of the present invention will be described below with reference to the drawings.

Figure 1:
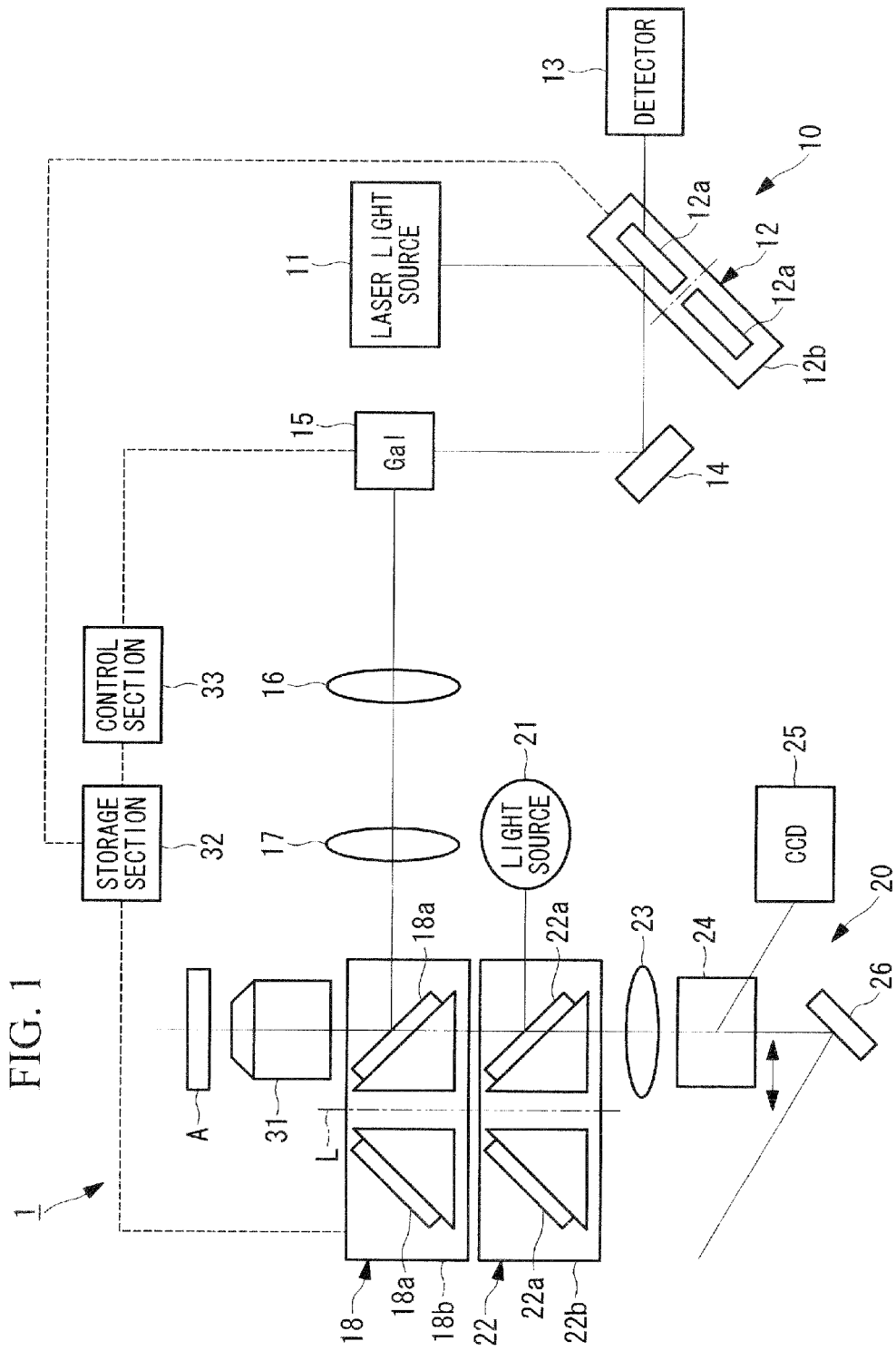
FIG. 1 is an outline configuration diagram of a microscope according to a first embodiment of the present invention.

As shown in FIG. 1, the microscope 1 of this embodiment includes a laser light source 11 that emits laser light (first illumination light), a light source 21 that emits white light (second illumination light), an objective lens (radiation optical system) 31 that radiates the laser light and the light from the light source 21 onto a specimen A, a first detection optical system 10 that detects fluorescence (first observation light) produced by radiating the laser light onto the specimen A, a second detection optical system 20 that detects return light (second observation light) containing fluorescence produced by radiating illumination light from the light source 21 onto the specimen A, a storage section 32 that stores correction information to be described later, and a control section (correction section) 33 that controls a galvanometer scanner 15 based on the correction information stored in the storage section 32. The fluorescence serving as the first observation light and the fluorescence serving as the second observation light may have the same wavelength or different wavelengths.

The laser light source 11 is a light source that emits laser light in the form of excitation light used to excite a fluorescent substance in the specimen A to make it produce fluorescence.

The light source 21 is a light source that emits white light, serving as illumination light, used to acquire a camera observation image of the specimen A.

The objective lens 31 radiates the laser light from the laser light source 11 onto the specimen A and collects fluorescence produced in the specimen A. Furthermore, the objective lens 31 radiates the illumination light from the light source 21 onto the specimen A and collects return light from the specimen A.

The first detection optical system 10 detects the fluorescence produced from the specimen A when the objective lens 31 radiates the laser light from the laser light source 11.

The second detection optical system 20 detects return light from the specimen A when the objective lens 31 radiates the illumination light from the light source 21.

The first detection optical system 10 includes an excitation filter unit 12, a detector 13, a mirror 14, a galvanometer scanner (scanning section) 15, a pupil projection lens 16, an imaging lens 17, and a first beam splitter 18.

In the first detection optical system 10, the excitation filter unit 12 is disposed on the optical axis of light emitted from the laser light source 11. Furthermore, the mirror 14, the galvanometer scanner 15, the pupil projection lens 16, the imaging lens 17, the first beam splitter 18, and the objective lens 31 are disposed in the path of light reflected at the excitation filter unit 12. Furthermore, the detector 13 is disposed in the path of light transmitted through the excitation filter unit 12.

The excitation filter unit 12 separates the laser light coming from the laser light source 11 and the fluorescence coming from the specimen A. The excitation filter unit 12 includes a plurality of dichroic filters 12a that reflect the laser light from the laser light source 11 and transmit the fluorescence from the specimen A, and a rotating turret 12b that rotates the plurality of dichroic filters 12a. The plurality of dichroic filters 12a are disposed around the same central point, and, by operating the rotating turret 12b, one of the plurality of dichroic filters 12a is selectively placed on the optical axis of the laser light source 11. In the excitation filter unit 12, the dichroic filter 12a to be placed on the optical axis of the laser light source 11 is switched according to the wavelength of the laser light from the laser light source 11.

The detector 13 detects fluorescence from the specimen A that has been transmitted through the excitation filter unit 12.

The mirror 14 reflects the laser light reflected at the excitation filter unit 12 toward the galvanometer scanner 15.

Figure 2:
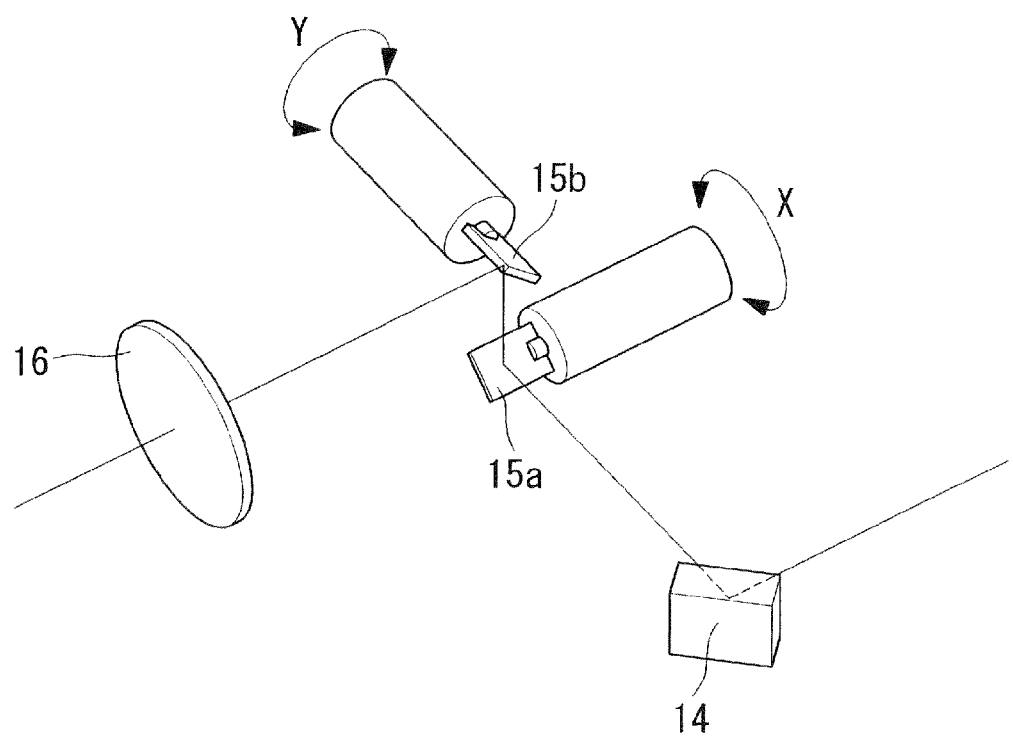
FIG. 2 is a schematic view of a galvanometer scanner shown in FIG. 1.

The galvanometer scanner 15 is a controlled galvanometer scanner in which the angles of mirrors can be desirably controlled, and includes a pair of galvanometer mirrors 15a and 15b that rotate about mutually orthogonal axes, as shown in FIG. 2. By changing the oscillation angles of the galvanometer mirrors 15a and 15b, 2D scanning is performed on the specimen A with the laser light from the laser light source 11. Specifically, the laser light is scanned on the specimen A in the X direction by oscillating the galvanometer mirror 15a, and the laser light is scanned on the specimen A in the Y direction (the direction orthogonal to the X direction) by oscillating the galvanometer mirror 15b.

The galvanometer scanner 15 is a so-called proximity galvanometer scanner, and the conjugate position of the objective lens pupil is located at the center between the pair of galvanometer mirrors 15a and 15b.

Furthermore, as will be described later, the operation of the galvanometer scanner 15 is controlled by the control section 33 based on the correction information stored in the storage section 32.

The first beam splitter 18 combines the laser light from the laser light source 11 and the illumination light from the light source 21 and separates the first observation light and the second observation light coming from the specimen A. The first beam splitter 18 includes a plurality of optical elements 18a and a rotating turret (switching section) 18b that rotates the plurality of optical elements 18a about an axial line L extending along the optical axis of the objective lens 31.

The optical elements 18a reflect the laser light from the laser light source 11 and the fluorescence from the specimen A, which is produced through irradiation with the laser light, and transmit the illumination light from the light source 21 and the returning illumination light from the specimen A. The optical elements 18a are disposed around the same central point about the axial line L, and, by operating the rotating turret 18b, one of the plurality of optical elements 18a is placed at the intersection of the optical axis of the imaging lens 17 and the optical axis of the objective lens 31.

In the first beam splitter 18, the optical element 18a to be placed on the optical axis of the objective lens 31 is selectively switched according to the wavelength of the laser light from the laser light source 11. With this configuration, the first beam splitter 18 combines the laser light from the laser light source 11 and the illumination light from the light source 21 and separates the first observation light and the second observation light coming from the specimen A, according to the wavelength of the laser light from the laser light source 11.

The second detection optical system 20 includes a second beam splitter 22, a lens 23, a mirror 24, a CCD 25, and a mirror 26.

In the second detection optical system 20, the second beam splitter 22 is disposed on the optical axis of light emitted from the light source 21. The first beam splitter 18 and the objective lens 31 are disposed in the path of light reflected at the second beam splitter 22. The lens 23, the mirror 24, which can be inserted into and removed from the light path, the CCD 25, and the mirror 26 are disposed in the path of light transmitted through the second beam splitter 22.

The second beam splitter 22 separates white light coming from the light source 21 and the returning white light coming from the specimen A. The white light from the light source 21 is set to have a desired illumination wavelength by an excitation filter (not shown), before entering the second beam splitter 22. The second beam splitter 22 includes a plurality of optical elements 22a and a rotating turret (switching section) 22b that rotates the plurality of optical elements 22a about the axial line L extending along the optical axis of the objective lens 31.

The optical elements 22a reflect light having a wavelength used for illumination, among the white light from the light source 21, and transmit return light from the specimen A. The optical elements 22a are disposed around the same central point about the axial line L, and, by operating the rotating turret 22b, one of the plurality of optical elements 22a is placed at the intersection of the optical axis of the light source 21 and the optical axis of the objective lens 31.

In the second beam splitter 22, the optical element 22a to be placed on the optical axis of the objective lens 31 is selectively switched according to the wavelength used for illumination, among the white light from the light source 21, and the wavelength detected by the CCD 25. With this configuration, the second beam splitter 22 guides the white light from the light source 21 to the specimen A as the second illumination light and guides the return light from the specimen A to the CCD 25.

The mirror 24 is inserted into or removed from the light path of the return light from the specimen A. When the mirror 24 is inserted into the light path, the return light from the specimen A is reflected by the mirror 24 toward the CCD 25. When the mirror 24 is removed from the light path, the return light from the specimen A passes therealong toward the mirror 26.

The CCD 25 detects the return light from the specimen A that has been reflected by the mirror 24.

The mirror 26 guides the return light from the specimen A to an eyepiece (not shown).

The storage section 32 stores correction information about a relative misalignment between the first observation light and the second observation light caused by switching the optical elements of the first beam splitter 18 and the excitation filter unit 12. Specifically, the amount of correction (correction information) of the relative misalignment between the first observation light and the second observation light caused by individual differences in the reflection angle and the seating position of the dichroic filter 12a of the excitation filter unit 12 and the optical element 18a of the first beam splitter 18 is stored in advance in the storage section 32 in association with the combination of the dichroic filter 12a and the optical element 18a.

The control section 33 corrects the relative misalignment between the first observation light and the second observation light, based on the correction information stored in the storage section 32. Specifically, the control section 33 reads, from the storage section 32, the amount of correction (correction information) associated with the combination of the dichroic filter 12a of the excitation filter unit 12 and the optical element 18a of the first beam splitter 18. Then, based on the amount of correction (correction information) read from the storage section 32, the control section 33 changes the oscillation angles of the galvanometer mirrors 15a and 15b of the galvanometer scanner 15, corrects the focal position of the laser light from the laser light source 11, and corrects the position of fluorescence produced from that focal position.

The operation of the microscope 1 of this embodiment, having the above-described configuration, will be described below.

In the microscope 1 of this embodiment, laser light emitted from the laser light source 11 is reflected by the excitation filter unit 12 and is focused by the objective lens 31 on the focal position in the specimen A via the mirror 14, the galvanometer scanner 15, the pupil projection lens 16, the imaging lens 17, and the first beam splitter 18. In this case, the galvanometer scanner 15 changes the oscillation angles of the galvanometer mirrors 15a and 15b, thereby performing 2D scanning on the specimen A with the laser light from the laser light source 11.

At the focal position in the specimen A, the fluorescent substance is excited to produce fluorescence. The fluorescence produced from the specimen A travels along the light path of the laser light in the reverse direction via the objective lens 31, the first beam splitter 18, the imaging lens 17, the pupil projection lens 16, the galvanometer scanner 15, and the mirror 14, is transmitted through the excitation filter unit 12, and is detected by the detector 13.

On the other hand, white light emitted from the light source 21 is reflected by the second beam splitter 22, is transmitted through the first beam splitter 18, and is focused by the objective lens 31 on the focal position in the specimen A. Furthermore, return light from the specimen A travels along the light path in the reverse direction and is detected by the CCD 25 via the objective lens 31, the first beam splitter 18, the second beam splitter 22, the lens 23, and the mirror 24.

In this case, when the wavelength of the laser light from the laser light source 11 is changed, it is necessary to switch the optical elements (the dichroic filter 12a of the excitation filter unit 12 and the optical element 18a of the first beam splitter 18) placed in the light path of the laser light. Furthermore, to change the wavelength of illumination performed by the light source 21, it is necessary to switch the optical element (the optical element 22a of the second beam splitter 22) placed in the light path of the white light. Here, a description will be given of an example case where the wavelength of the laser light from the laser light source 11 is changed, and the optical element 18a of the first beam splitter 18 and the dichroic filter 12a of the excitation filter unit 12 are switched.

In this case, the rotating turret 12b of the excitation filter unit 12 selectively switches among the plurality of dichroic filters 12a to place the dichroic filter 12a corresponding to the wavelength of the laser light from the laser light source 11 on the optical axis of the laser light source 11. Furthermore, the rotating turret 18b of the first beam splitter 18 selectively switches among the plurality of optical elements 18a to place the optical element 18a corresponding to the wavelength of the laser light from the laser light source 11 (specifically, the wavelength of the fluorescence from the specimen A) on the optical axis of the objective lens 31. Thus, the fluorescence and the return light coming from the specimen A are separated by the selected optical element 18a and are detected by the first detection optical system 10 (the detector 13) and the second detection optical system 20 (the CCD 25), respectively.

In this case, the optical axes of the first observation light (laser light) and the second observation light may be shifted due to the individual differences in the reflection angle and the seating position of the dichroic filter 12a and the optical element 18a, thus causing a displacement between an image acquired through laser scanning observation and an image acquired through camera (CCD) observation. Thus, the control section 33 corrects the relative misalignment between the first observation light and the second observation light based on the correction information stored in the storage section 32.

Specifically, the storage section 32 stores the amount of correction (correction information) of the relative misalignment between the first observation light and the second observation light, which is caused by the individual differences in the reflection angle and the seating position of the dichroic filter 12a and the optical element 18a, in association with the combination of the dichroic filter 12a and the optical element 18a.

The control section 33 reads, from the storage section 32, the amount of correction (correction information) associated with the combination of the dichroic filter 12a and the optical element 18a. Then, based on the amount of correction (correction information) read from the storage section 32, the control section 33 changes the oscillation angles of the galvanometer mirrors 15a and 15b of the galvanometer scanner 15, corrects the focal position of the laser light from the laser light source 11, and corrects the position of fluorescence produced from that focal position.

By doing so, it is possible to correct the displacement between a laser scanning image acquired by the detector 13 and a camera observation image acquired by the CCD 25, thus acquiring the laser scanning image and the camera observation image without any displacement. Therefore, the laser scanning image and the camera observation image can be displayed with the corresponding positions on the specimen A being matched.

Furthermore, since the galvanometer scanner 15 is operated to correct the focal position of the laser light from the laser light source 11, it is possible to easily acquire a laser scanning image and a camera observation image without any displacement, without providing a new device.

Note that a description has been given above of the case where, when the wavelength of the laser light from the laser light source 11 is changed, the optical element 18a of the first beam splitter 18 and the dichroic filter 12a of the excitation filter unit 12 are both switched; however, one of the optical element 18a and the dichroic filter 12a may be switched.

Second Embodiment

A microscope 2 according to a second embodiment will be described below with reference to the drawings. The microscope of this embodiment and microscopes of modifications will be described below mainly in terms of the differences from the microscope 1 of the first embodiment, identical reference symbols are assigned to parts in common with the microscope 1 of the first embodiment, and a description thereof will be omitted.

Figure 3:
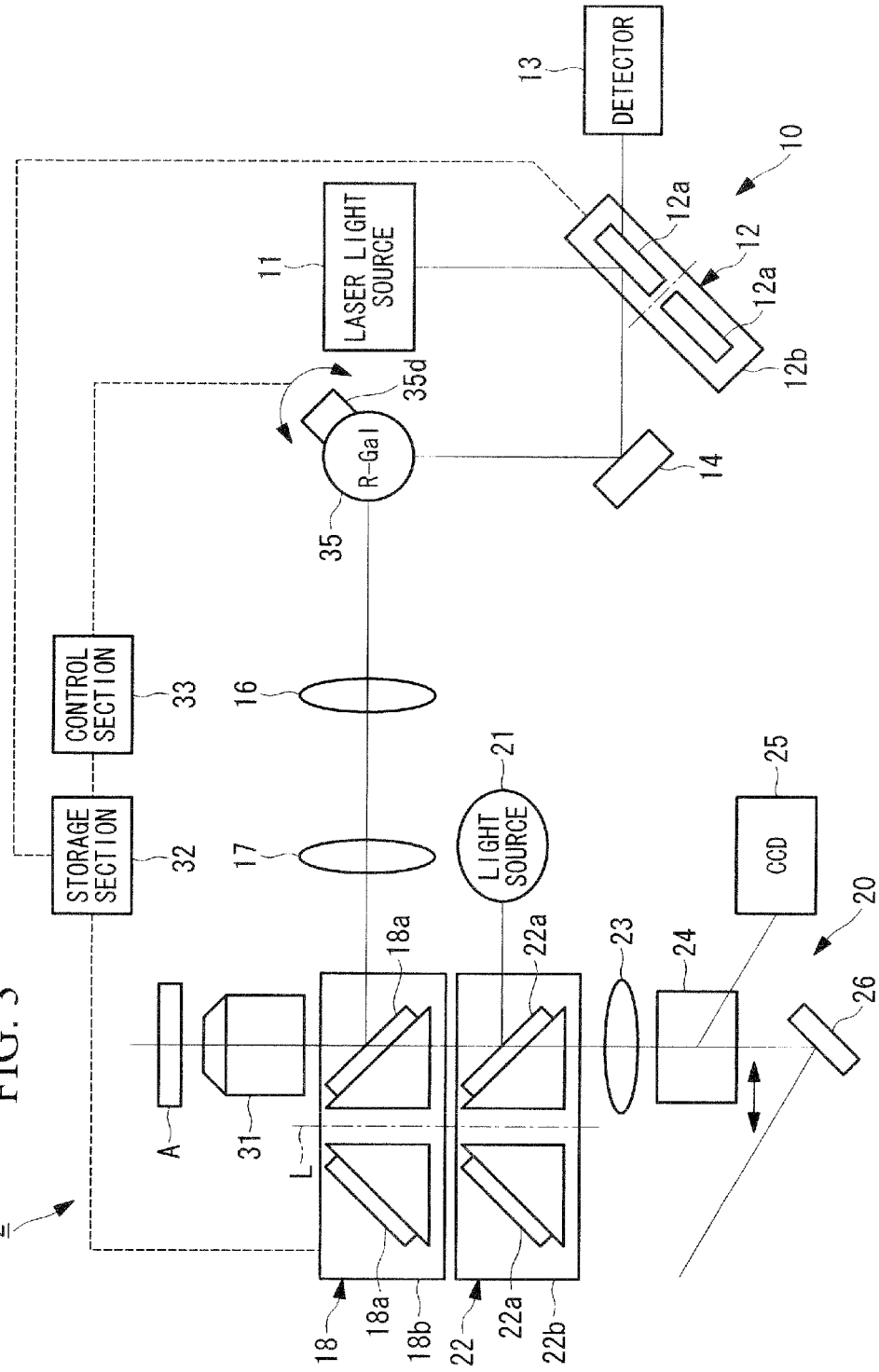
FIG. 3 is an outline configuration diagram of a microscope according to a second embodiment of the present invention.

As shown in FIG. 3, the microscope 2 of this embodiment includes a resonant galvanometer scanner 35 having a resonant galvanometer mirror, instead of the galvanometer scanner 15 (see FIG. 1) of the microscope 1 of the first embodiment.

Figure 4:
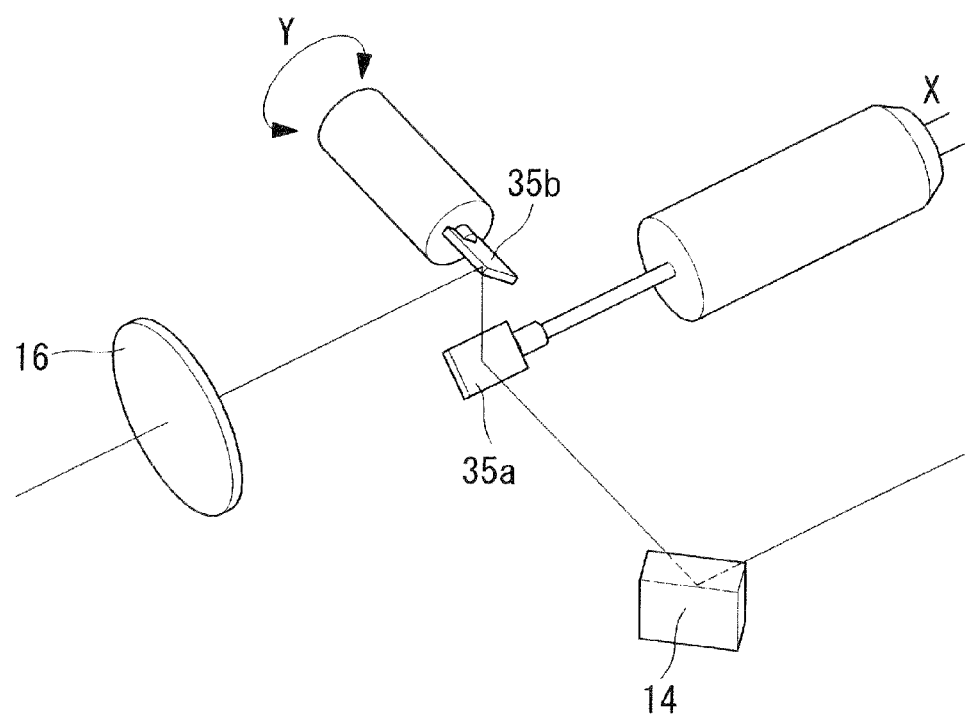
FIG. 4 is a schematic view of a resonant galvanometer scanner shown in FIG. 3.

As shown in FIG. 4, the resonant galvanometer scanner 35 has a resonant galvanometer mirror 35a and a controlled galvanometer mirror 35b that rotate about mutually orthogonal axes. By operating the resonant galvanometer mirror 35a and the controlled galvanometer mirror 35b, high-speed 2D scanning is performed on the specimen A with laser light from the laser light source 11. Specifically, the resonant galvanometer mirror 35a is vibrated at a resonant frequency, thus scanning the laser light on the specimen A in the X direction, and the controlled galvanometer mirror 35b is rotated, thus scanning the laser light on the specimen A in the Y direction (the direction orthogonal to the X direction).

The resonant galvanometer mirror 35a is provided with a rotating mechanism (for example, stepping motor) 35d that rotates the resonant galvanometer mirror 35a. The center position of scanning performed by the resonant galvanometer mirror 35a can be changed by operating the rotating mechanism 35d. The operation of the rotating mechanism 35d is controlled by the control section 33 based on the correction information stored in the storage section 32.

The control section 33 corrects a relative misalignment between the first observation light detected by the detector 13 and the second observation light detected by the CCD 25, based on the correction information stored in the storage section 32. Specifically, the control section 33 reads, from the storage section 32, the amount of correction (correction information) associated with the combination of the dichroic filter 12a of the excitation filter unit 12 and the optical element 18a of the first beam splitter 18. Then, based on the amount of correction (correction information) read from the storage section 32, the control section 33 operates the rotating mechanism 35d of the resonant galvanometer scanner 35 to change the center position of scanning performed by the resonant galvanometer mirror 35a, thus correcting the misalignment in the X direction. On the other hand, based on the read amount of correction, the control section 33 corrects the oscillation angle of the scanning mirror of the controlled galvanometer mirror 35b, as described in the first embodiment, thus correcting the misalignment in the Y direction. Thus, the focal position of the laser light from the laser light source 11 is corrected, and the position of fluorescence produced from that focal position is corrected.

The operation of the microscope 2 of this embodiment, having the above-described configuration, will be described below.

In the microscope 2 of this embodiment, laser light emitted from the laser light source 11 is reflected by the excitation filter unit 12, and is focused by the objective lens 31 on the focal position in the specimen A via the mirror 14, the resonant galvanometer scanner 35, the pupil projection lens 16, the imaging lens 17, and the first beam splitter 18. In this case, in the resonant galvanometer scanner 35, the resonant galvanometer mirror 35a is vibrated at the resonant frequency, and the oscillation angle of the controlled galvanometer mirror 35b is changed, thus performing 2D scanning of the laser light from the laser light source 11 on the specimen A.

At the focal position in the specimen A, the fluorescent substance is excited to produce fluorescence. The fluorescence produced from the specimen A travels along the light path of the laser light in the reverse direction via the objective lens 31, the first beam splitter 18, the imaging lens 17, the pupil projection lens 16, the resonant galvanometer scanner 35, and the mirror 14, is transmitted through the excitation filter unit 12, and is detected by the detector 13.

On the other hand, white light emitted from the light source 21 is reflected by the second beam splitter 22, is transmitted through the first beam splitter 18, and is focused by the objective lens 31 on the focal position in the specimen A. Furthermore, the second observation light from the specimen A travels along the light path of the white light in the reverse direction and is detected by the CCD 25 via the objective lens 31, the first beam splitter 18, the second beam splitter 22, the lens 23, and the mirror 24.

In this case, when the wavelength of the laser light from the laser light source 11 is changed, it is necessary to switch the optical elements (the dichroic filter 12a of the excitation filter unit 12 and the optical element 18a of the first beam splitter 18) placed in the light path of the laser light. Furthermore, to change the wavelength of illumination performed by the light source 21, it is necessary to switch the optical element (the optical element 22a of the second beam splitter 22) placed in the light path of the white light. Here, a description will be given of an example case where the wavelength of the laser light from the laser light source 11 is changed, and the optical element 18a of the first beam splitter 18 and the dichroic filter 12a of the excitation filter unit 12 are switched.

In this case, the rotating turret 12b of the excitation filter unit 12 selectively switches among the plurality of dichroic filters 12a to place the dichroic filter 12a corresponding to the wavelength of the laser light from the laser light source 11 on the optical axis of the laser light source 11. Furthermore, the rotating turret 18b of the first beam splitter 18 selectively switches among the plurality of optical elements 18a to place the optical element 18a corresponding to the wavelength of the laser light from the laser light source 11 (specifically, the wavelength of the fluorescence from the specimen A) on the optical axis of the objective lens 31. Thus, the first observation light and the second observation light coming from the specimen A are separated by the selected optical element 18a and are detected by the first detection optical system 10 (the detector 13) and the second detection optical system 20 (the CCD 25), respectively.

In this case, the optical axes of the first observation light (laser light) and the second observation light may be shifted due to the individual differences in the reflection angle and the seating position of the dichroic filter 12a and the optical element 18a, thus causing a displacement between an image acquired through laser scanning observation and an image acquired through camera (CCD) observation. Thus, the control section 33 corrects the relative misalignment between the first observation light and the second observation light based on the correction information stored in the storage section 32.

Specifically, the storage section 32 stores the amount of correction (correction information) of the relative misalignment between the first observation light and the second observation light, which is caused by the individual differences in the reflection angle and the seating position of the dichroic filter 12a and the optical element 18a, in association with the combination of the dichroic filter 12a and the optical element 18a.

The control section 33 reads, from the storage section 32, the amount of correction (correction information) associated with the combination of the dichroic filter 12a and the optical element 18a. Then, based on the amount of correction (correction information) read from the storage section 32, the control section 33 can perform fine-tuning of the optical axis of the laser light (first observation light) by rotating the resonant galvanometer mirror 35a with the rotating mechanism 35d and can correct the relative displacement between a laser scanning image acquired by the detector 13 and a camera observation image acquired by the CCD 25.

By doing so, it is possible to correct the displacement between the laser scanning image acquired by the detector 13 and the camera observation image acquired by the CCD 25, thus acquiring the laser scanning image and the camera observation image without any displacement. Therefore, the laser scanning image and the camera observation image can be displayed with the corresponding positions on the specimen A being matched.

Furthermore, with use of the resonant galvanometer scanner 35 as the scanning section, a 2D-scanning image of the specimen A can be acquired at high speed.

Note that a description has been given above of the case where, when the wavelength of the laser light from the laser light source 11 is changed, the optical element 18a of the first beam splitter 18 and the dichroic filter 12a of the excitation filter unit 12 are both switched; however, one of the optical element 18a and the dichroic filter 12a may be switched.

Furthermore, when the resonant galvanometer mirror is used as a Y galvanometer mirror for scanning laser light in the Y direction, it is just necessary to provide a rotating mechanism, as for the X axis, to correct the position in the Y direction. Furthermore, even when the controlled galvanometer mirror is used as the Y galvanometer mirror, a rotating mechanism may be provided for correction, as in this embodiment.

First Modification

A first modification of the microscope 2 according to the second embodiment will be described below.

Figure 5:
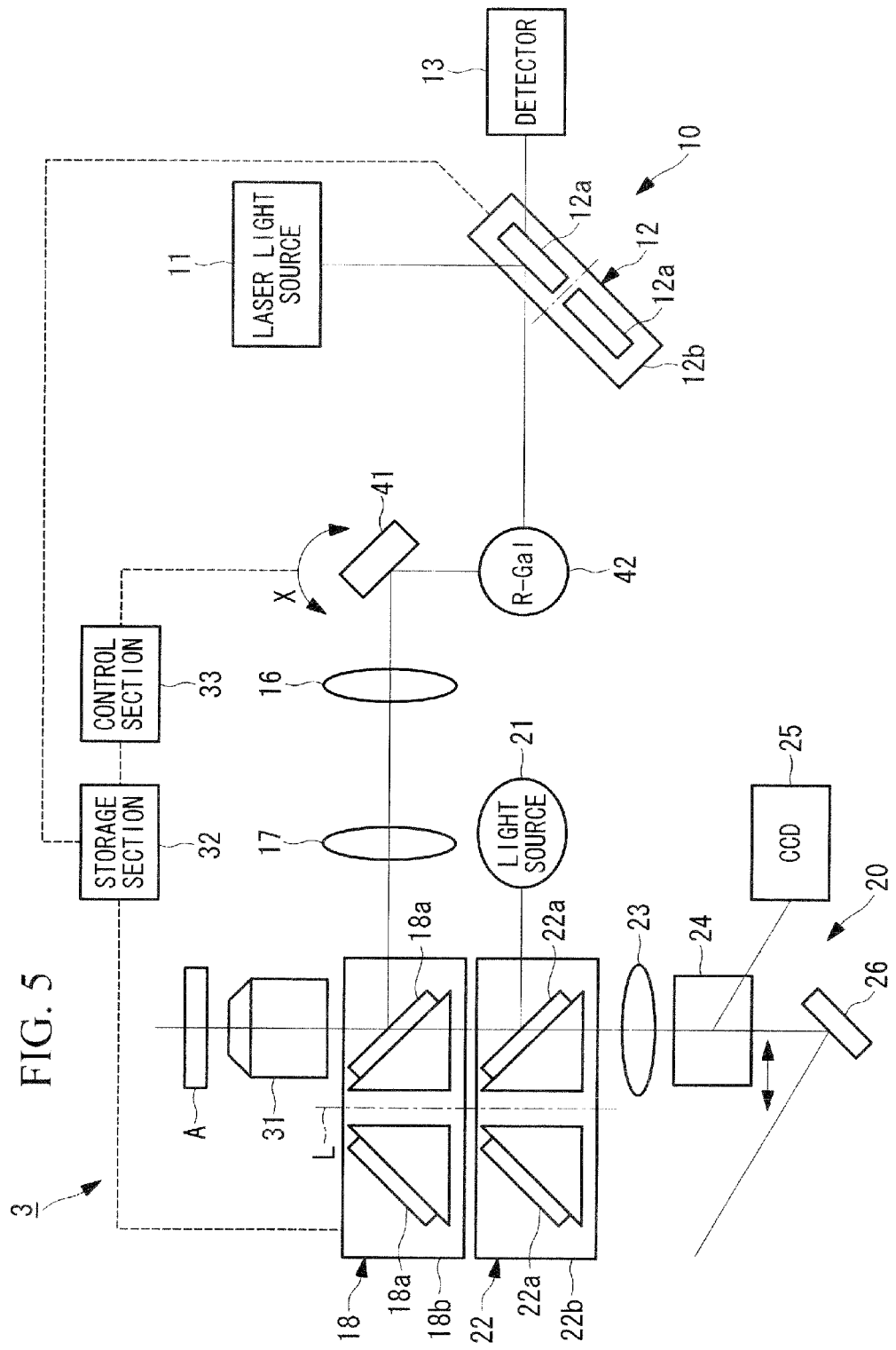
FIG. 5 is an outline configuration diagram of a microscope according to a first modification of the present invention.

As shown in FIG. 5, a microscope 3 of this modification includes a rotating mirror 41 and a resonant galvanometer scanner 42, instead of the resonant galvanometer scanner 35 (see FIG. 3) of the microscope 2 of the second embodiment.

The rotating mirror 41 is a mirror whose angle can be adjusted about an axis in the Y direction, and the center position of scanning of the laser light from the laser light source 11 is changed in the X direction by changing the rotation angle of the rotating mirror 41.

Figure 6:
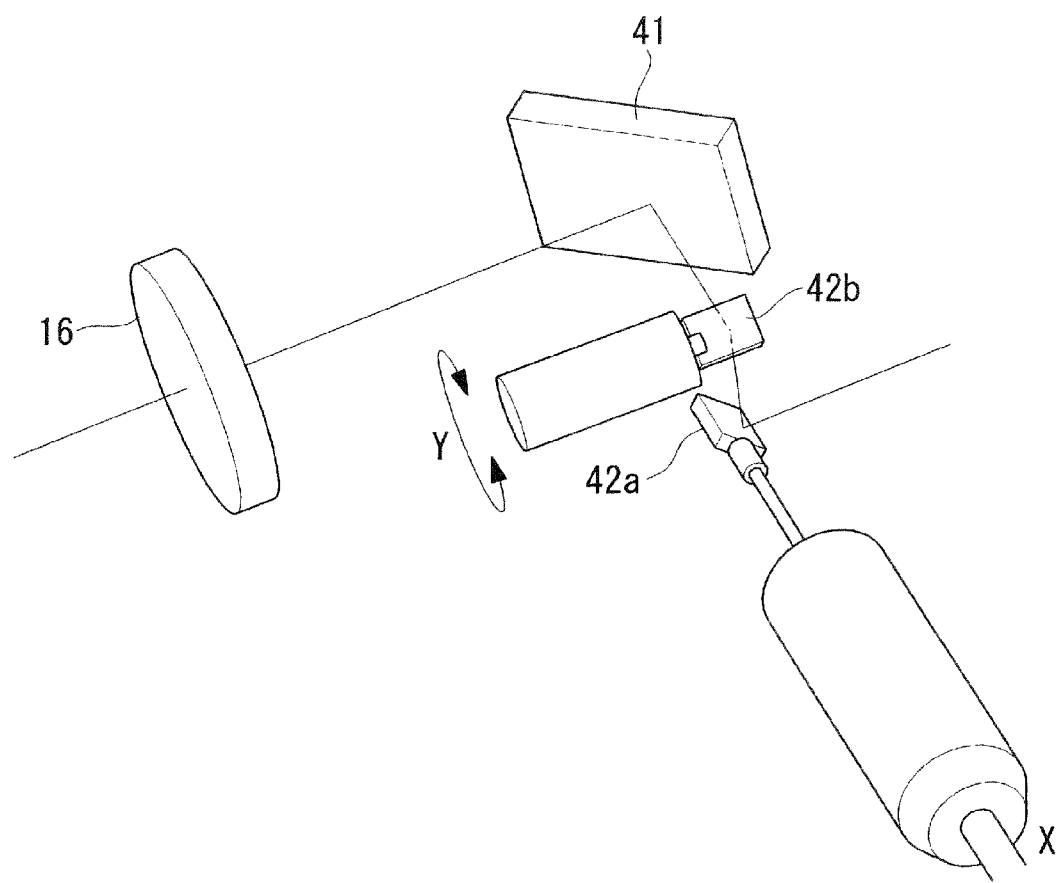
FIG. 6 is a schematic view of a resonant galvanometer scanner shown in FIG. 5.

The resonant galvanometer scanner 42 has a resonant galvanometer mirror 42a and a controlled galvanometer mirror 42b that rotate about mutually orthogonal axes, as shown in FIG. 6. By operating the resonant galvanometer mirror 42a and the controlled galvanometer mirror 42b, high-speed 2D scanning is performed on the specimen A with the laser light from the laser light source 11. Specifically, laser light is scanned at high speed on the specimen A in the X direction by vibrating the resonant galvanometer mirror 42a at the resonant frequency, and laser light is scanned on the specimen A in the Y direction (the direction orthogonal to the X direction) by oscillating the controlled galvanometer mirror 42b.

The operation of the rotating mirror 41 and the controlled galvanometer mirror 42b is controlled by the control section 33 based on the correction information stored in the storage section 32.

The control section 33 corrects the relative misalignment between the first observation light and the second observation light based on the correction information stored in the storage section 32. Specifically, the control section 33 reads, from the storage section 32, the amount of correction (correction information) associated with the combination of the dichroic filter 12a of the excitation filter unit 12 and the optical element 18a of the first beam splitter 18. Then, based on the amount of correction (correction information) read from the storage section 32, the control section 33 operates the rotating mirror 41 to correct the displacement in the X direction and changes the oscillation angle of the controlled galvanometer mirror 42b. Thus, the focal position of the laser light from the laser light source 11 is corrected, and the position of fluorescence produced from that focal position is corrected.

According to the microscope 3 of this modification, having the above-described configuration, it is possible to perform fine-tuning of the optical axis of the laser light (first observation light) by changing the angle of the rotating mirror 41 in the same direction as the scanning direction of the resonant galvanometer mirror 42a and to correct the relative displacement between a laser scanning image and a camera observation image. Furthermore, by using the resonant galvanometer mirror 42a as the scanning section, it is possible to perform high-speed scanning on the specimen A in the X direction and to acquire a 2D-scanning image of the specimen A at high speed.

Second Modification

A second modification of the microscope 2 according to the second embodiment will be described below.

Figure 7:
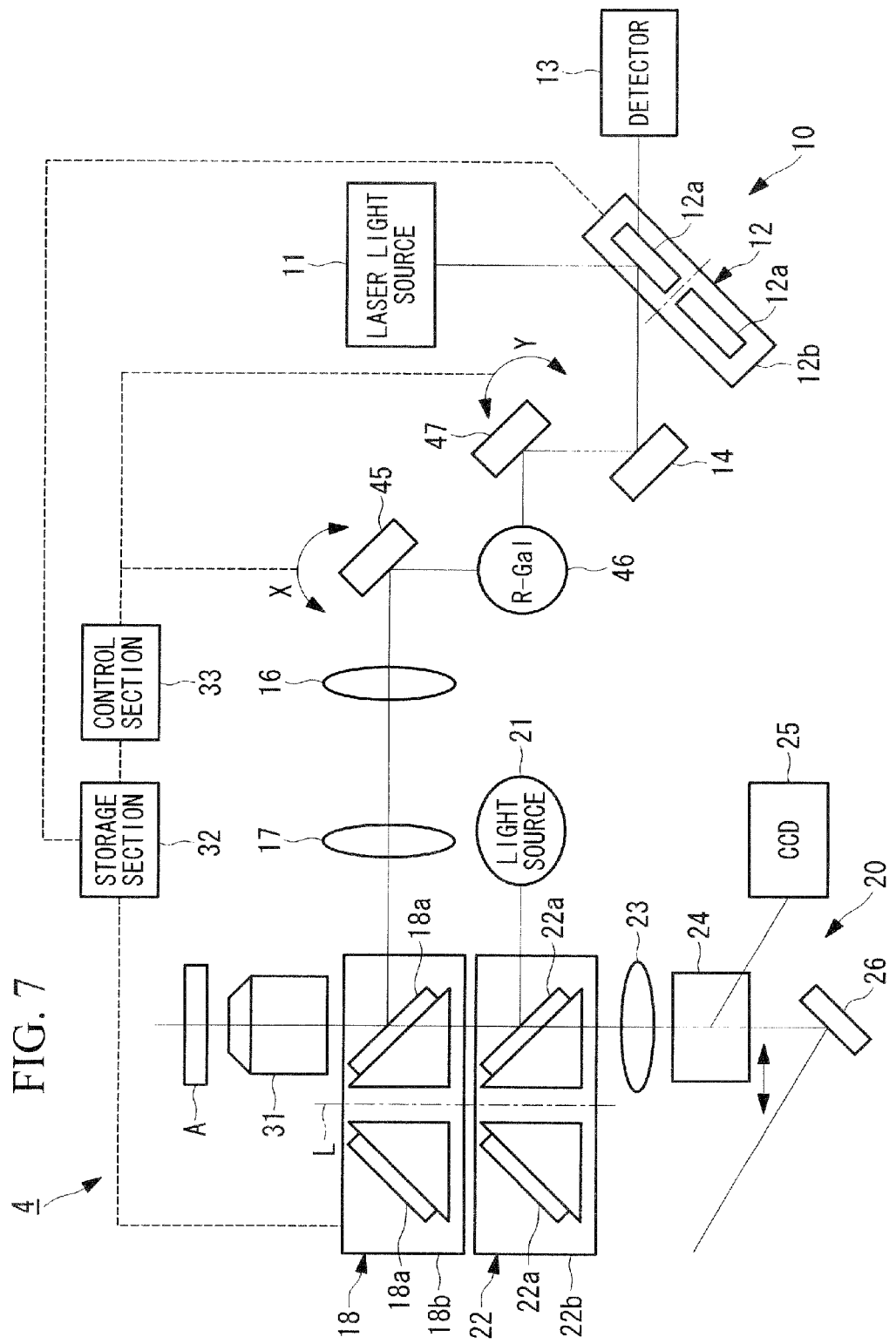
FIG. 7 is an outline configuration diagram of a microscope according to a second modification of the present invention.

As shown in FIG. 7, a microscope 4 of this modification includes a rotating mirror 45, a resonant galvanometer scanner 46, and a rotating mirror 47, instead of the resonant galvanometer scanner 35 (see FIG. 3) of the microscope 2 of the second embodiment.

The rotating mirror 45 is a rotating mirror whose angle can be adjusted about an axis in the Y direction, and the center position of scanning of the laser light from the laser light source 11 is changed in the X direction by changing the oscillation angle of the rotating mirror 45.

The rotating mirror 47 is a rotating mirror whose angle can be adjusted about an axis in the X direction, and the center position of scanning of the laser light from the laser light source 11 is changed in the Y direction by changing the oscillation angle of the rotating mirror 47.

Figure 8:
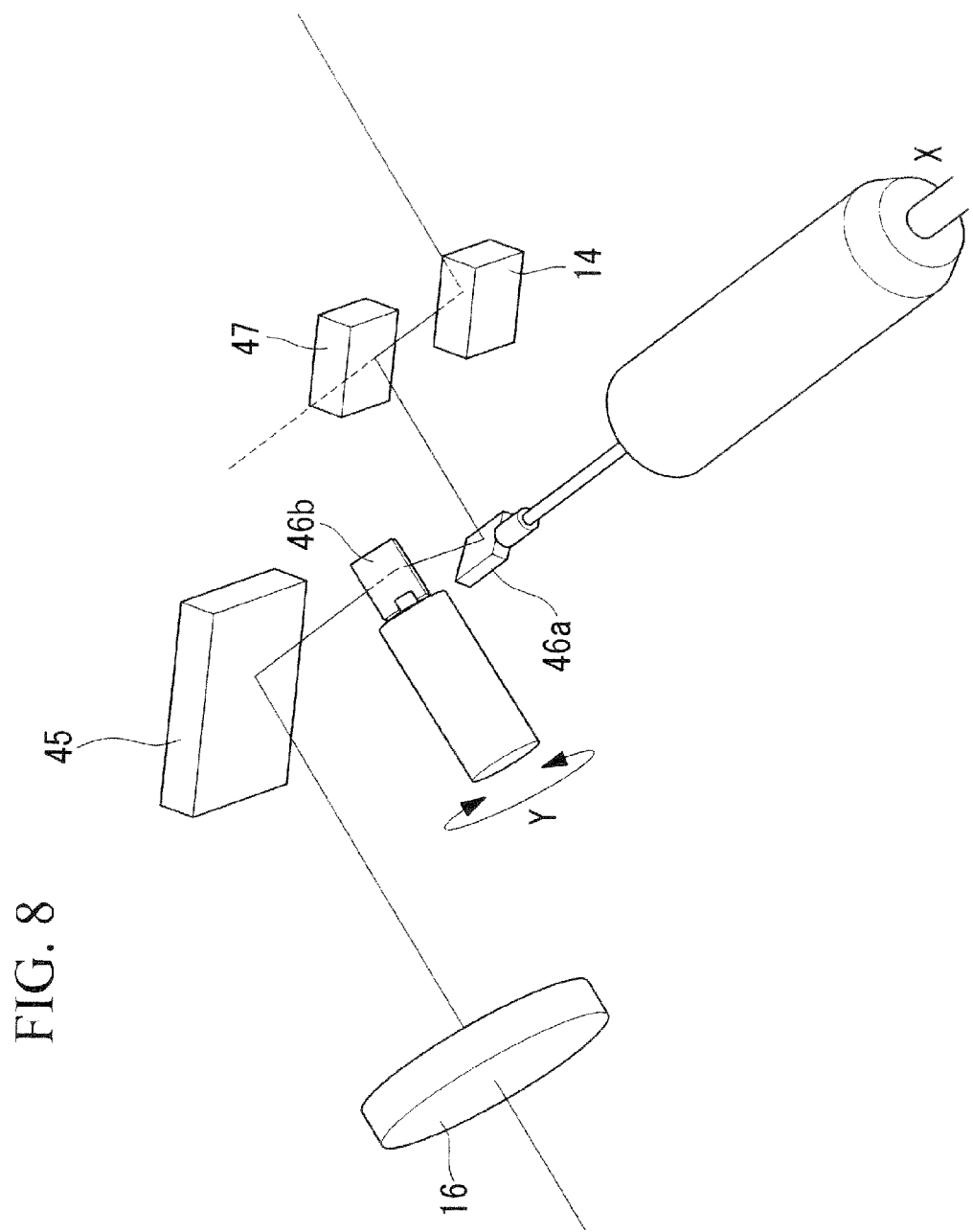
FIG. 8 is a schematic view of a resonant galvanometer scanner shown in FIG. 7.

As shown in FIG. 8, the resonant galvanometer scanner 46 has a resonant galvanometer mirror 46a and a controlled galvanometer mirror 46b that rotate about mutually orthogonal axes. By operating the resonant galvanometer mirror 46a and the controlled galvanometer mirror 46b, high-speed 2D scanning is performed on the specimen A with the laser light from the laser light source 11. Specifically, laser light is scanned on the specimen A in the X direction by vibrating the resonant galvanometer mirror 46a at the resonant frequency, and laser light is scanned on the specimen A in the Y direction (the direction orthogonal to the X direction) by oscillating the controlled galvanometer mirror 46b.

The operation of the rotating mirror 45 and the rotating mirror 47 is controlled by the control section 33 based on the correction information stored in the storage section 32.

The control section 33 corrects the relative misalignment between the first observation light and the second observation light based on the correction information stored in the storage section 32. Specifically, the control section 33 reads, from the storage section 32, the amount of correction (correction information) associated with the combination of the dichroic filter 12a of the excitation filter unit 12 and the optical element 18a of the first beam splitter 18. Then, based on the amount of correction (correction information) read from the storage section 32, the control section 33 operates the rotating mirror 45 and the rotating mirror 47 to change the rotation angles thereof. Thus, the focal position of the laser light from the laser light source 11 is corrected, and the position of fluorescence produced from that focal position is corrected.

According to the microscope 4 of this modification, having the above-described configuration, it is possible to perform fine-tuning of the optical axis of the laser light (first observation light) by changing the angles of the rotating mirrors 45 and 47 in the same directions as the scanning directions of the resonant galvanometer mirror 46a and the controlled galvanometer mirror 46b, respectively, to correct the relative displacement between a laser scanning image and a camera observation image. Furthermore, by using the resonant galvanometer mirror 46a in the scanning section, it is possible to perform high-speed 2D scanning on the specimen A and to acquire a 2D-scanning image of the specimen A at high speed.
Third Modification A third modification of the microscope 2 according to the second embodiment will be described below.

Figure 9:
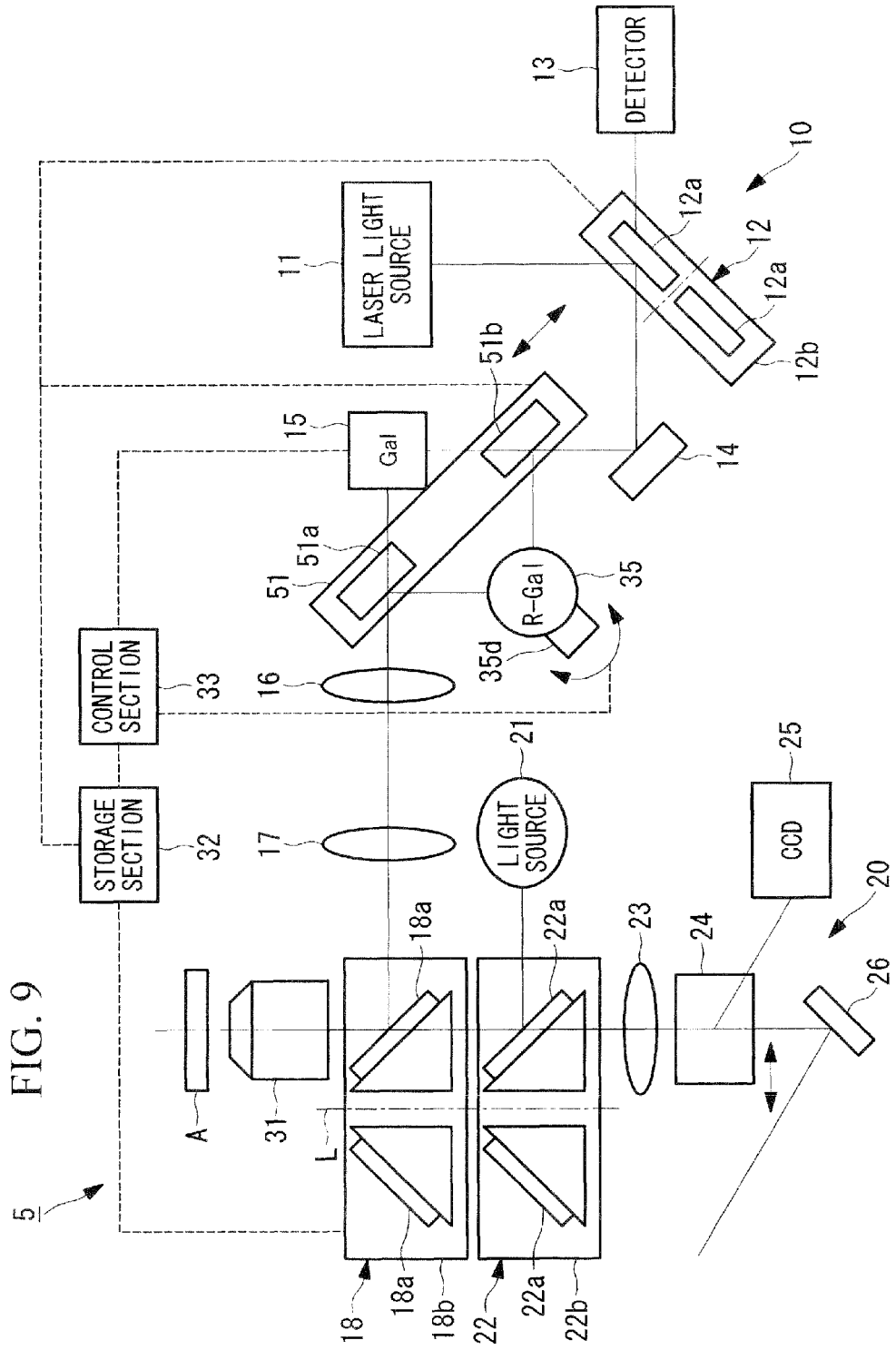
FIG. 9 is an outline configuration diagram of a microscope according to a third modification of the present invention.

As shown in FIG. 9, a microscope 5 of this modification has a configuration obtained by combining the microscope 1 (see FIG. 1) of the first embodiment and the microscope 2 (see FIG. 3) of the second embodiment and has a galvanometer switching device 51 that is inserted into or removed from the light path of laser light (fluorescence).

The galvanometer switching device 51 includes mirrors 51a and 51b that reflect laser light from the laser light source 11 and fluorescence from the specimen A and a driving section (not shown) that inserts or removes the mirrors 51a and 51b into or from the light path of laser light (fluorescence).

In a state in which the mirrors 51a and 51b are inserted into the light path of laser light (fluorescence), the mirror 51b is disposed in the path of light reflected at the mirror 14, and the mirror 51a is disposed on the optical axis of the pupil projection lens 16. In this state, laser light from the laser light source 11 is made incident on the resonant galvanometer scanner 35 by the mirror 51b and is guided to the pupil projection lens 16 by the mirror 51a.

On the other hand, in a state in which the mirrors 51a and 51b are removed from the light path of laser light (fluorescence), laser light from the laser light source 11 is reflected at the mirror 14, passes via the galvanometer scanner 15, and is guided to the pupil projection lens 16.

Thus, by inserting or removing the mirrors 51a and 51b into or from the light path of laser light (fluorescence), the scanning section that scans laser light from the laser light source 11 can be switched to either the galvanometer scanner 15 or the resonant galvanometer scanner 35.

Note that, in the microscope 5 of this modification, since the configurations of the galvanometer scanner 15 (see FIG. 2) and the resonant galvanometer scanner 35 (see FIG. 4) are the same as those of the above-described embodiments, a description thereof will be omitted here.

According to the microscope 5 of this modification, by operating the galvanometer switching device 51, the scanning section that scans laser light from the laser light source 11 can be switched to either the galvanometer scanner 15 or the resonant galvanometer scanner 35. Furthermore, when the galvanometer scanner 15 is used as the scanning section that scans laser light from the laser light source 11, it is possible to correct the displacement between a laser scanning image acquired by the detector 13 and a camera observation image acquired by the CCD 25 with high accuracy and to improve the accuracy of alignment of the laser scanning image and the camera observation image. On the other hand, when the resonant galvanometer scanner 35 is used as the scanning section that scans laser light from the laser light source 11, it is possible to perform high-speed 2D scanning on the specimen A and to acquire a 2D-scanning image of the specimen A at high speed.
Fourth Modification A fourth modification of the microscope 2 according to the second embodiment will be described below.

Figure 10:
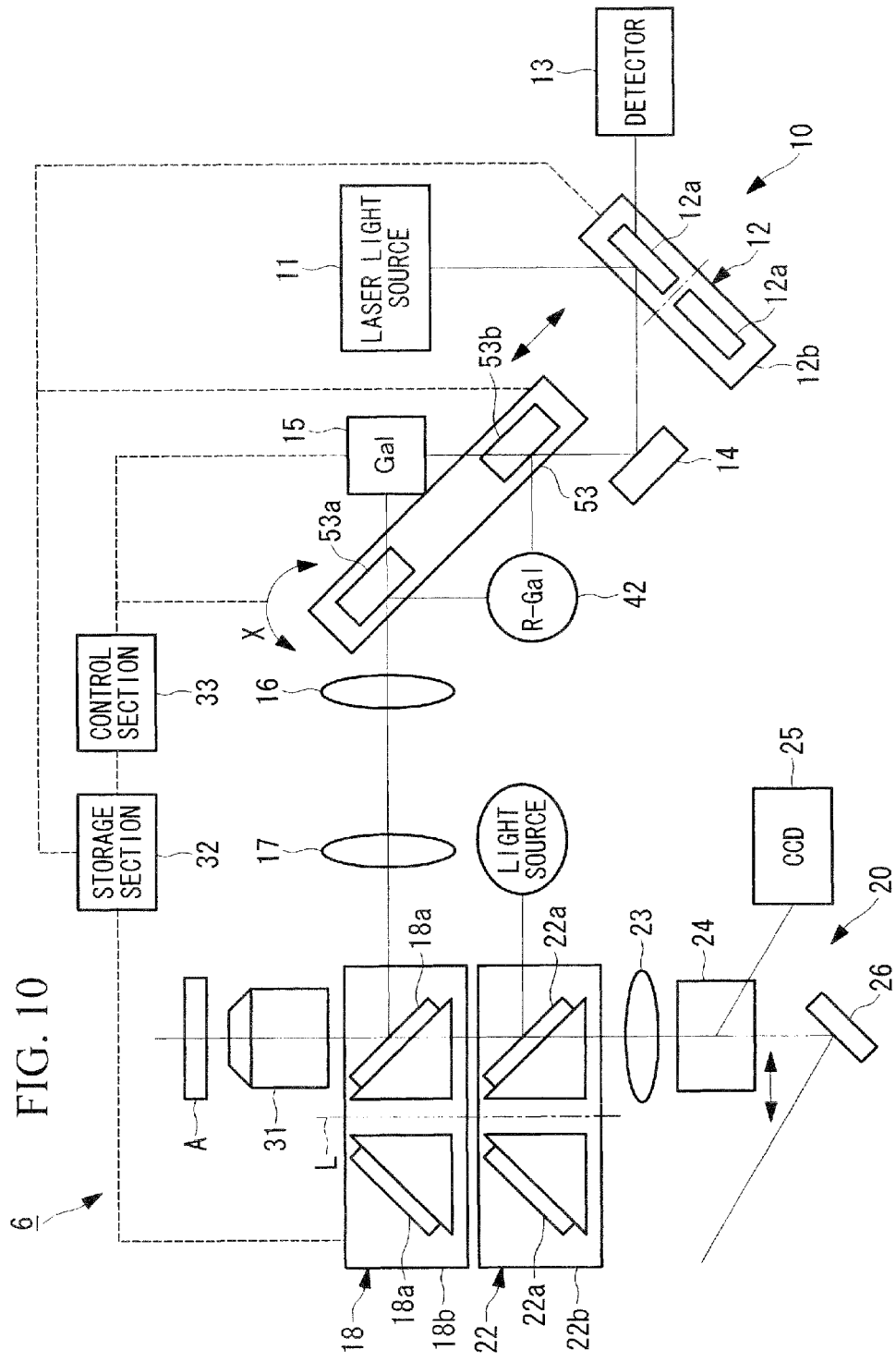
FIG. 10 is an outline configuration diagram of a microscope according to a fourth modification of the present invention.

As shown in FIG. 10, a microscope 6 of this modification has a configuration obtained by combining the microscope 1 (see FIG. 1) of the first embodiment and the microscope 3 (see FIG. 5) of the first embodiment and has a galvanometer switching device 53 that is inserted into or removed from the light path of laser light (first observation light).

The galvanometer switching device 53 includes mirrors 53a and 53b that reflect laser light from the laser light source 11 and fluorescence from the specimen A and a driving section (not shown) that inserts or removes the mirrors 53a and 53b into or from the light path of laser light (fluorescence).

In a state in which the mirrors 53a and 53b are inserted into the light path of laser light (fluorescence), the mirror 53b is disposed in the path of light reflected at the mirror 14, and the mirror 53a is disposed on the optical axis of the pupil projection lens 16. In this state, laser light from the laser light source 11 is made incident on the resonant galvanometer scanner 42 by the mirror 53b and is guided to the pupil projection lens 16 by the mirror 53a.

On the other hand, in a state in which the mirrors 53a and 53b are removed from the light path of laser light (fluorescence), laser light from the laser light source 11 is reflected at the mirror 14, passes via the galvanometer scanner 15, and is guided to the pupil projection lens 16.

Thus, by inserting or removing the mirrors 53a and 53b into or from the light path of laser light (fluorescence), the scanning section that scans laser light from the laser light source 11 can be switched to either the galvanometer scanner 15 or the resonant galvanometer scanner 42.

Here, the mirror 53a of the galvanometer switching device 53 is a rotating mirror whose angle can be adjusted about an axis in the Y direction, and the center position of scanning of laser light from the laser light source 11 is changed in the X direction by changing the angle of the mirror 53a. The operation of the mirror 53a is controlled by the control section 33 based on the correction information stored in the storage section 32, as for the controlled galvanometer mirror 42b and the galvanometer mirrors 15a and 15b of the galvanometer scanner 15.

Note that, in the microscope 6 of this modification, since the configurations of the galvanometer scanner 15 (see FIG. 2) and the resonant galvanometer scanner 42 (see FIG. 6) are the same as those of the above-described embodiment and modification, a description thereof will be omitted here.

According to the microscope 6 of this modification, by operating the galvanometer switching device 53, the scanning section that scans laser light from the laser light source 11 can be switched to either the galvanometer scanner 15 or the resonant galvanometer scanner 42. Furthermore, when the galvanometer scanner 15 is used as the scanning section that scans laser light from the laser light source 11, it is possible to correct the displacement between a laser scanning image acquired by the detector 13 and a camera observation image acquired by the CCD 25 with high accuracy and to improve the accuracy of alignment of the laser scanning image and the camera observation image. On the other hand, when the resonant galvanometer scanner 42 is used as the scanning section that scans laser light from the laser light source 11, it is possible to perform high-speed 2D scanning on the specimen A and to acquire a 2D-scanning image of the specimen A at high speed.

Third Embodiment

A microscope 7 according to a third embodiment will be described below with reference to the drawings. The microscope 7 of this embodiment will be described below mainly in terms of the differences from the microscopes of the above-described embodiments and modifications, identical reference symbols are assigned to parts in common with those microscopes, and a description thereof will be omitted.

Figure 11:
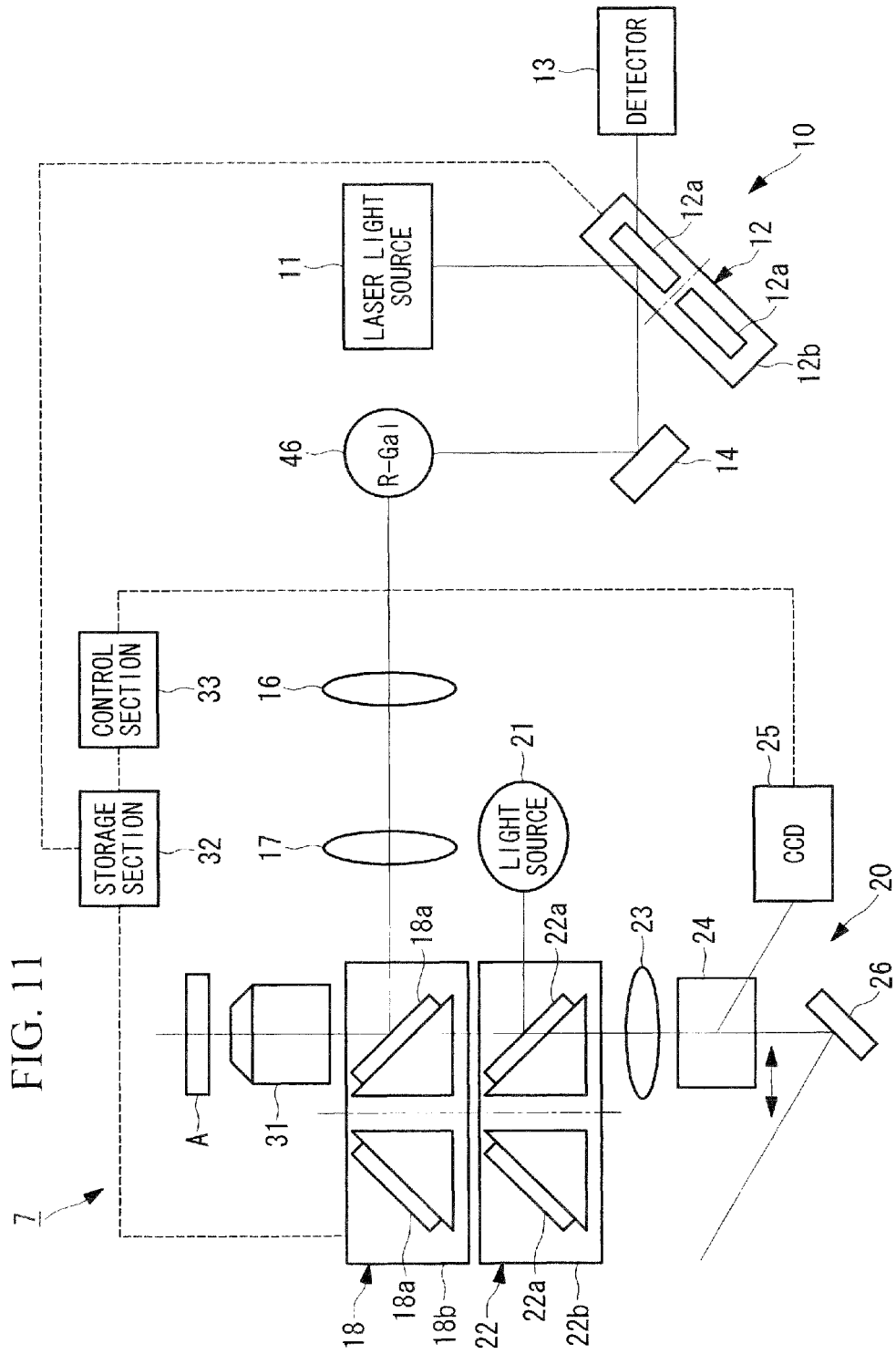
FIG. 11 is an outline configuration diagram of a microscope according to a third embodiment of the present invention.

As shown in FIG. 11, in the microscope 7 of this embodiment, the correction section, which corrects the displacement between a laser scanning image and a camera observation image, is not provided for the first detection optical system 10, which acquires the laser scanning image, but is provided for the second detection optical system 20, which acquires the camera observation image.

In the microscope 7 of this embodiment, the control section 33 changes the viewing-field center position of the camera observation image acquired by the CCD 25, based on the correction information stored in the storage section 32, thus correcting the relative displacement between the laser scanning image and the camera observation image.

The above-described processing performed by the control section 33 will be described by using a specific example shown in FIG. 12.

Figure 12:
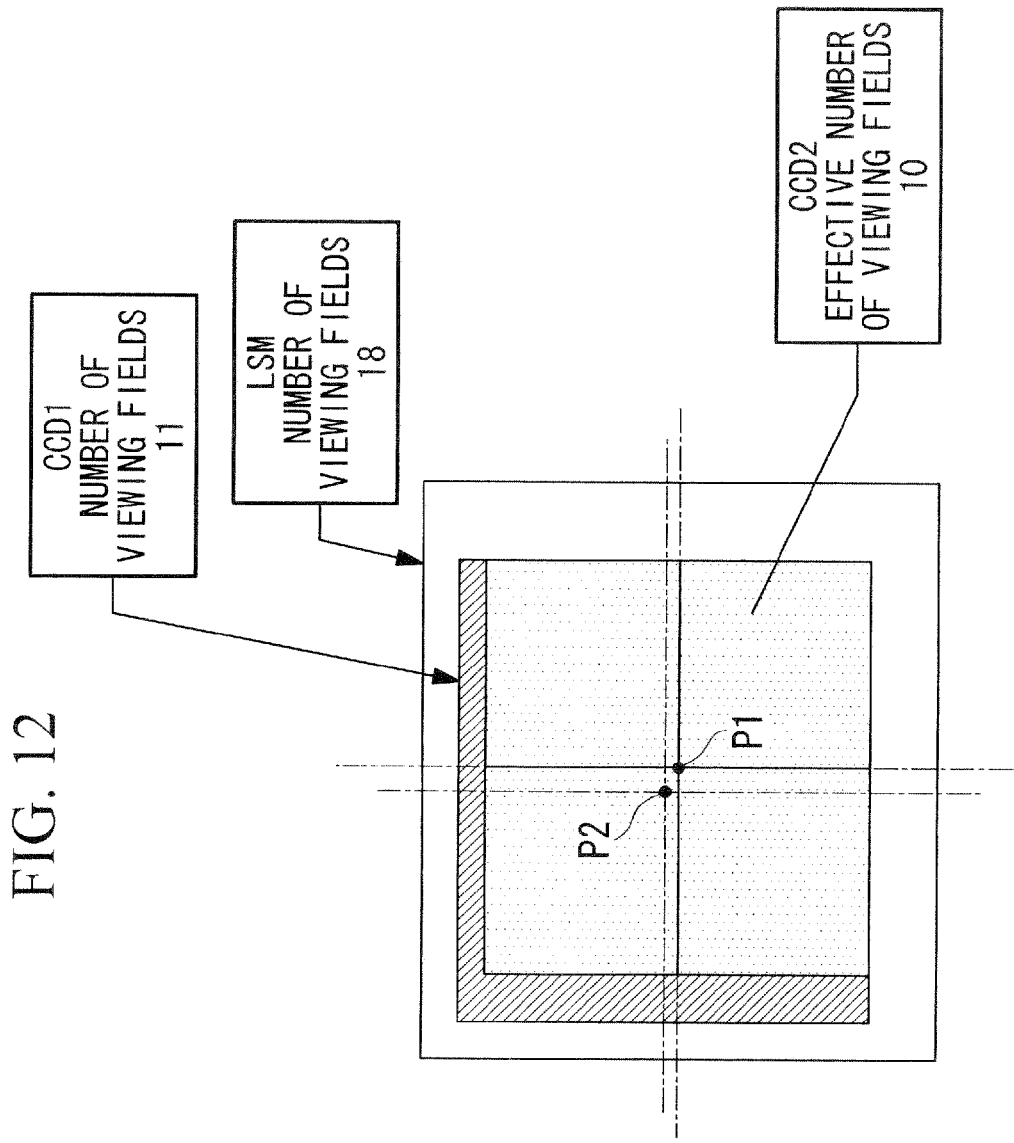
FIG. 12 is a diagram for explaining image ranges acquired by a CCD shown in FIG. 11.

As shown in FIG. 12, a displacement is caused between a laser scanning image (indicated by "LSM" in FIG. 12) acquired by the first detection optical system 10 and a camera observation image (indicated by "CCD1" in FIG. 12) acquired by the second detection optical system 20.

The control section 33 changes the image acquisition range of the CCD 25 such that a center position P2 of the camera observation image matches a center position P1 of the laser scanning image, thus correcting the camera observation image acquired by the CCD 25 (indicated by "CCD2" in FIG. 12).

Specifically, since the number of viewing fields (18 viewing fields in the example shown in FIG. 12) of the laser scanning image is larger than the number of viewing fields (11 viewing fields in the example shown in FIG. 12) of the camera observation image, the effective number of viewing fields of the CCD 25 is reduced (to 10 viewing fields in the example shown in FIG. 12) such that the center position P2 of the camera observation image matches the center position P1 of the laser scanning image.

Note that, to adjust the center position of the laser scanning image, image data in which the center position is shifted may be cropped from acquired one frame, without changing the image acquisition range of the CCD 25 itself.

As described above, according to the microscope 7 of this embodiment, the viewing-field center position of the CCD 25 is adjusted based on the correction information stored in the storage section 32, thus making it possible to correct the relative displacement between the laser scanning image and the camera observation image.

Fourth Embodiment

A microscope 8 according to a fourth embodiment will be described below with reference to the drawings. The microscope 8 of this embodiment will be described below mainly in terms of the differences from the microscope 1 of the first embodiment, identical reference symbols are assigned to parts in common with the microscope 1 of the first embodiment, and a description thereof will be omitted.

Figure 13:
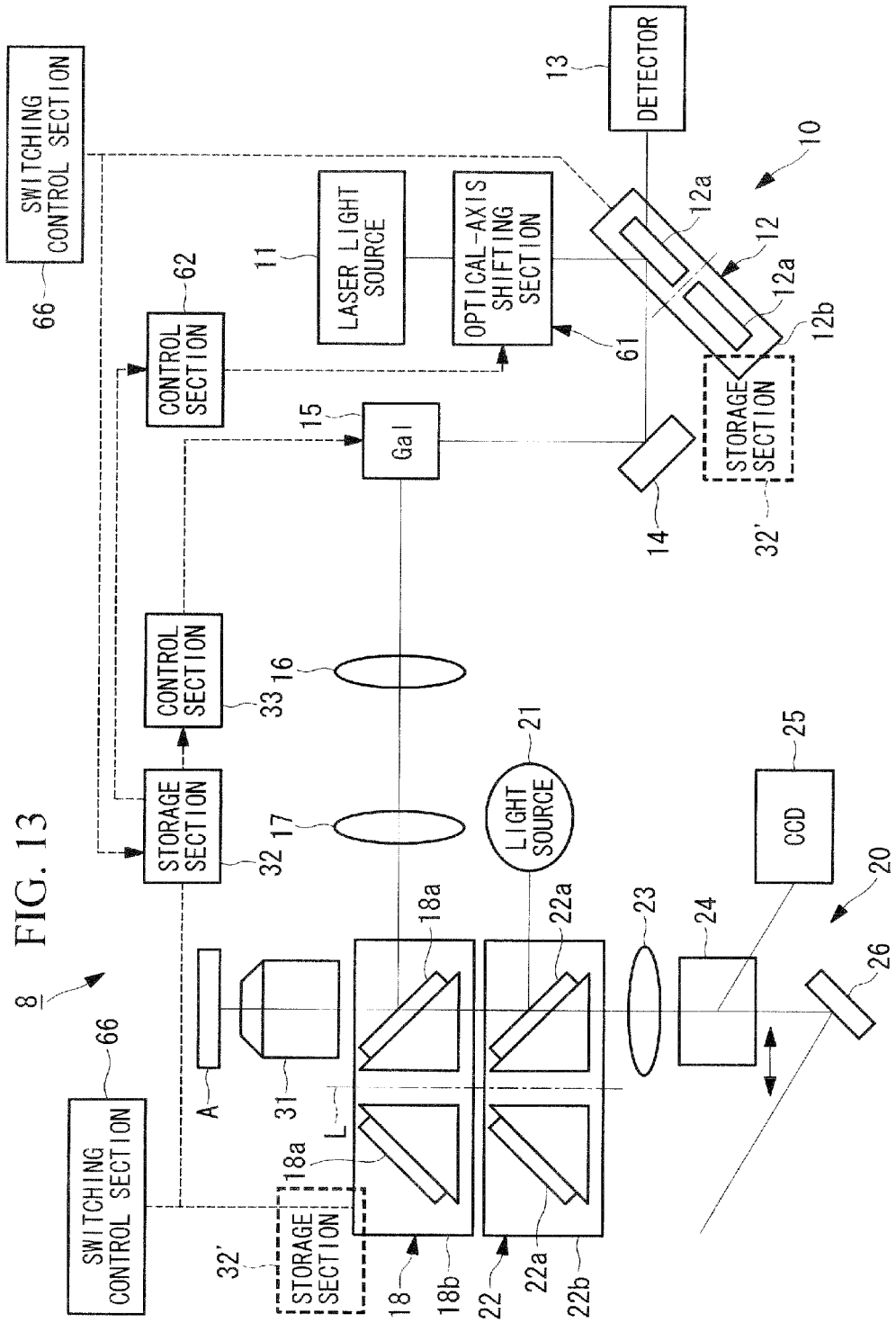
FIG. 13 is an outline configuration diagram of a microscope according to a fourth embodiment of the present invention.

As shown in FIG. 13, the microscope 8 of this embodiment differs from the microscope 1 of the first embodiment shown in FIG. 1 in that an optical-axis shifting section 61 and a control section (optical-axis correcting section) 62 that controls the optical-axis shifting section 61 are further provided and in that switching control sections 66 are provided between the excitation filter unit 12 and the storage section 32 and between the first beam splitter 18 and the storage section 32.

The switching control sections 66 control selection of the dichroic filter 12a and the optical element 18a to be used in the excitation filter unit 12 and the first beam splitter 18, respectively. Information about the types of the selected dichroic filter 12a and optical element 18a is transferred to the storage section 32, the control section 33, and the control section 62. The control section 33 and the control section 62 read corresponding correction information based on this information and control correction of the galvanometer scanner 15 and the optical-axis shifting section 61, respectively.

The same configuration as in FIG. 13 can also be employed in the first to third embodiments.

Figure 14A:
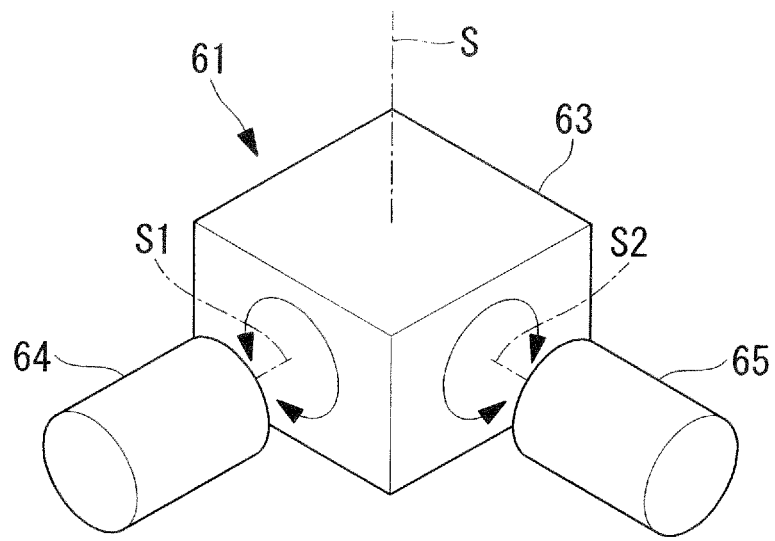
FIG. 14A is a perspective view for explaining an optical-axis shift section provided in the microscope shown in FIG. 13.
Figure 14B:
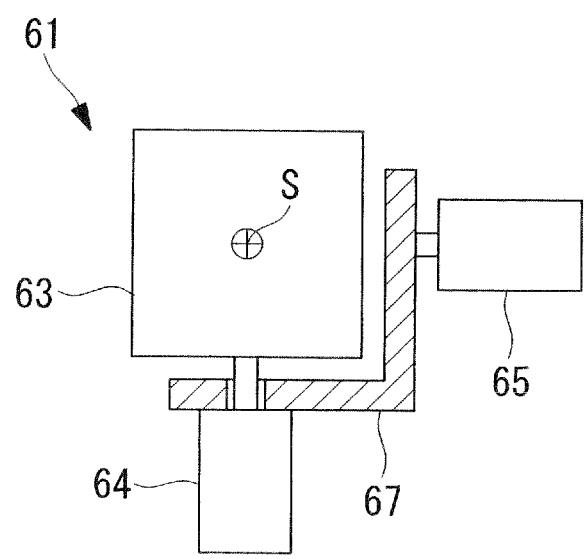
FIG. 14B is a plan view for explaining an optical-axis shift section provided in the microscope shown in FIG. 13.

As shown in FIG. 14A, the optical-axis shifting section 61 includes a flat parallel plate 63 disposed on an optical axis S between the laser light source 11 and the excitation filter unit 12 of the first detection optical system 10; and motors (actuators) 64 and 65 that rotate the flat parallel plate 63 about mutually orthogonal axes S1 and S2, respectively, the axes S1 and S2 being orthogonal to the optical axis S. Specifically, as shown in FIG. 14B, a driving shaft of the motor 64, for example, is fixed to the flat parallel plate 63. A driving shaft of the motor 65 is fixed to a bracket 67 that is fixed to a stator of the motor 64. In this way, it is possible to shift the optical axis by the optical-axis shifting section 61.

The control section 62 operates the optical-axis shifting section 61 based on the correction information stored in the storage section 32. The storage section 32 stores a table shown in FIG. 15A, used by the control section 33, which controls the galvanometer scanner 15, and a table shown in FIG. 15B, used by the control section 62, which controls the optical-axis shifting section 61. In each of the tables, correction information is stored corresponding to the combinations of the dichroic filters 12a provided in the excitation filter unit 12 and the optical elements 18a provided in the first beam splitter 18.

The control section 62 operates the motors 64 and 65 based on the correction information stored in the storage section 32 to change the inclination angle of the flat parallel plate 63 with respect to the optical axis S. As a result, the optical axis S of laser light passing via the flat parallel plate 63 is shifted in a direction orthogonal to the optical axis S, thereby making it possible to shift the optical axis in the pupil of the objective lens 31.

Specifically, if the angle of the dichroic filter 12a provided in the excitation filter unit 12 is shifted, the optical axis of the laser light in the pupil of the objective lens 31 is shifted. However, according to the microscope 8 of this embodiment, since the optical axis S is shifted in advance through the inclination of the flat parallel plate 63 in the direction to cancel the shift, it is possible to make laser light properly enter the pupil of the objective lens 31 without any eccentricity and to prevent the occurrence of illumination unevenness on the specimen A. Note that the flat parallel plate 63 can be disposed at any position between the laser light source 11 and the galvanometer scanner 15.

Instead of the above-described method for storing the correction information, storage areas may be provided in the control section 33, which controls the galvanometer scanner 15, and the control section 62, which controls the optical-axis shifting section 61, and the correction information may be stored in the storage areas.

For example, as the method for storing the correction information, it is possible to use a method in which the angle errors of the optical elements to be switched are stored, and the control section calculates the driving level of the galvanometer scanner for correction and the driving level of the optical-axis shifting section for correction, based on this angle error information.

Furthermore, the above-described storage method or correction-amount calculation method can be used even in the first to third embodiments, in which only the displacement between images is corrected by the galvanometer mirror.

Furthermore, as indicated by dashed lines in FIG. 13, a storage section 32' that stores correction information may be integrally provided in each of the switching units (the excitation filter unit 12 and the first beam splitter 18). By doing so, when the switching units mounted on the microscope main body are replaced, for example, the corresponding correction information is also integrally replaced; therefore, time and effort needed to revise the correction information can be eliminated. The correction information stored in the storage section 32' may be collectively read after the switching units are replaced and held in the corresponding control sections 33 and 62 or may be read for each correction operation.

Although the embodiments of the present invention have been described above in detail with reference to the drawings, specific configurations are not limited to those embodiments, and design changes that do not depart from the scope of the present invention are also encompassed. For example, the present invention is not limited to the above-described embodiments and modifications and may be applied to an embodiment obtained by appropriately combining these embodiments and modifications.

Furthermore, in the embodiments, a description has been given of the case where the first illumination light is laser light, and the second illumination light is white light. However, the types thereof are not limited thereto, and, for example, the second illumination light may be light having a particular wavelength band.

What is claimed is:

1. A microscope comprising:
    a radiation optical system that radiates first illumination light and second illumination light onto a specimen;
    a first detection optical system that detects first observation light produced from the specimen when the first illumination light is radiated by the radiation optical system so as to acquire a first image;
    a second detection optical system that detects second observation light produced from the specimen when the second illumination light is radiated by the radiation optical system so as to acquire a second image;
    a plurality of optical elements that are placed so as to be capable of being inserted into or removed from a light path of at least one of the first detection optical system and the second detection optical system;
    a switching section that selectively switches the optical elements to be inserted into the light path;
    a storage section that stores correction information about a relative displacement between the first image and the second image, the relative displacement being caused when the optical elements are switched by the switching section; and
    a correction section that corrects the relative displacement between the first image and the second image based on the correction information stored in the storage section.

2. The microscope according to claim 1, further comprising a scanning section that performs 2D scanning of the first illumination light on the specimen,
    wherein the correction section operates the scanning section based on the correction information stored in the storage section.

3. The microscope according to claim 1, further comprising a scanning section that performs 2D scanning of the first illumination light on the specimen,
    wherein the scanning section has a resonant galvanometer mirror; and
    wherein the correction section rotates the resonant galvanometer mirror.

4. The microscope according to claim 1, further comprising a scanning section that performs 2D scanning of the first illumination light on the specimen,
    wherein the scanning section has a resonant galvanometer mirror; and
    wherein the correction section operates a mirror whose angle can be changed in a same direction as a scanning direction of the resonant galvanometer mirror.

5. The microscope according to claim 1,
    wherein a detection section of the second detection optical system comprises a CCD; and
    wherein the correction section adjusts a viewing-field center position of the second image, which is acquired by the CCD, based on the correction information stored in the storage section.

6. The microscope according to claim 1, further comprising:
    an objective lens that radiates the first illumination light and the second illumination light onto the specimen and collects the first observation light and the second observation light;
    an optical-axis shifting section that shifts the first illumination light in a pupil of the objective lens in a direction intersecting an optical axis; and
    an optical-axis correcting section that operates the optical-axis shifting section based on the correction information stored in the storage section.

7. The microscope according to claim 6, wherein the optical-axis shifting section comprises:
    a flat parallel plate that is disposed on an optical axis of the first illumination light; and
    actuators that rotate the flat parallel plate about mutually orthogonal axes extending in two directions orthogonal to the optical axis of the first illumination light.

8. The microscope according to claim 6, wherein the storage section separately stores a correction value used to operate a scanning section that performs 2D scanning of the first illumination light on the specimen and a correction value used to operate the optical-axis shifting section.

9. The microscope according to claim 6, further comprising a scanning section that performs 2D scanning of the first illumination light on the specimen,
    wherein the correction section operates the scanning section based on the correction information stored in the storage section.

10. The microscope according to claim 6, further comprising a scanning section that performs 2D scanning of the first illumination light on the specimen,
    wherein the scanning section has a resonant galvanometer mirror; and
    wherein the correction section rotates the resonant galvanometer mirror.

11. The microscope according to claim 6, further comprising a scanning section that performs 2D scanning of the first illumination light on the specimen,
    wherein the scanning section has a resonant galvanometer mirror; and
    wherein the correction section operates a mirror whose angle can be changed in a same direction as a scanning direction of the resonant galvanometer mirror.

12. The microscope according to claim 6,
    wherein a detection section of the second detection optical system comprises a CCD; and
    wherein the correction section adjusts a viewing-field center position of the second image, which is acquired by the CCD, based on the correction information stored in the storage section.

13. The microscope according to claim 9, wherein the optical-axis shifting section comprises:
   a flat parallel plate that is disposed on an optical axis of the first illumination light; and
   actuators that rotate the flat parallel plate about mutually orthogonal axes extending in two directions orthogonal to the optical axis of the first illumination light.

14. The microscope according to claim 9, wherein the storage section separately stores a correction value used to operate the scanning section and a correction value used to operate the optical-axis shifting section.

15. The microscope according to claim 2,
   wherein a detection section of the second detection optical system comprises a CCD; and
   wherein the correction section adjusts a viewing-field center position of the second image, which is acquired by the CCD, based on the correction information stored in the storage section.

16. The microscope according to claim 1,
   wherein a detection section of the second detection optical system is a camera; and
   wherein the correction section adjusts a viewing-field center position of the second image, which is acquired by the camera, based on the correction information stored in the storage section.

17. The microscope according to claim 6,
   wherein a detection section of the second detection optical system is a camera; and
   wherein the correction section adjusts a viewing-field center position of the second image, which is acquired by the camera, based on the correction information stored in the storage section.

\* \* \* \* \*